United States Patent
Papadopoulos et al.

(10) Patent No.: US 10,299,165 B2
(45) Date of Patent: May 21, 2019

(54) METHOD AND APPARATUS FOR USER/BASE-STATION SIGNALING AND ASSOCIATION ACHIEVING LOAD BALANCING ACROSS WIRELESS MULTI-BAND HETEROGENEOUS NETWORKS

(71) Applicants: Haralabos Papadopoulos, Los Altos, CA (US); Ozgun Bursalioglu Yilmaz, Santa Clara, CA (US)

(72) Inventors: Haralabos Papadopoulos, Los Altos, CA (US); Ozgun Bursalioglu Yilmaz, Santa Clara, CA (US)

(73) Assignee: NTT DOCOMO, INC., Tokyo (JP)

( * ) Notice: Subject to any disclaimer, the term of this patent is extended or adjusted under 35 U.S.C. 154(b) by 90 days.

(21) Appl. No.: 14/980,781

(22) Filed: Dec. 28, 2015

(65) Prior Publication Data
US 2016/0192238 A1    Jun. 30, 2016

Related U.S. Application Data

(60) Provisional application No. 62/098,118, filed on Dec. 30, 2014.

(51) Int. Cl.
| | |
|---|---|
| *H04W 28/08* | (2009.01) |
| *H04W 72/04* | (2009.01) |
| *H04W 48/00* | (2009.01) |

(52) U.S. Cl.
CPC .......... *H04W 28/08* (2013.01); *H04W 48/00* (2013.01)

(58) Field of Classification Search
CPC .. H04W 28/08; H04W 72/0486; H04W 48/00
USPC .......................................................... 370/235
See application file for complete search history.

(56) References Cited

U.S. PATENT DOCUMENTS

| | | | | |
|---|---|---|---|---|
| 2005/0113028 | A1* | 5/2005 | Uchida | H04W 48/16 455/67.7 |
| 2006/0193292 | A1* | 8/2006 | Bansal | H04L 47/11 370/331 |
| 2008/0085723 | A1* | 4/2008 | Tsao | H04W 16/08 455/452.2 |
| 2009/0303974 | A1* | 12/2009 | Chi | H04W 28/08 370/338 |
| 2012/0020339 | A1* | 1/2012 | Lai | H04W 48/20 370/338 |

(Continued)

*Primary Examiner* — Faisal Choudhury
(74) *Attorney, Agent, or Firm* — Womble Bond Dickinson (US) LLP

(57) ABSTRACT

A method and apparatus are disclosed herein for user/base station signaling and load balancing across a wireless network. In one embodiment, the method comprises broadcasting, by a first base station in the wireless network, information indicative of the load of the first base station; receiving an association request from the user terminal for association with the first base station in response to the user terminal predicting a net throughput from the first base station, based on the information indicative of the load, being greater than net throughput from a second base station to which the user terminal is currently associated; and determining whether to accept the association request while performing an association process for selectively allowing only a fraction of requests from user terminals to associated with the base station.

40 Claims, 6 Drawing Sheets

(56) References Cited

U.S. PATENT DOCUMENTS

2014/0106827 A1* 4/2014 Lim ................. H04W 52/0287
455/574
2015/0109940 A1* 4/2015 Okhravi ............. H04L 43/0888
370/252

* cited by examiner

METHOD AND APPARATUS FOR USER/BASE-STATION SIGNALING AND ASSOCIATION ACHIEVING LOAD BALANCING ACROSS WIRELESS MULTI-BAND HETEROGENEOUS NETWORKS

PRIORITY

The present patent application claims priority to and incorporates by reference the corresponding provisional patent application Ser. No. 62/098,118, titled, "Method and Apparatus for User/Base-Station Signaling and Association Achieving Load Balancing Across Wireless Multi-Band Heterogeneous Networks", filed on Dec. 30, 2014.

BACKGROUND OF THE INVENTION

Dense cellular network deployments relying on the use of Massive MIMO technology are becoming very attractive candidates for future radio access technologies. This is partly due to the promise of Massive MIMO for providing very large throughput increases per base station (BS), due to its ability to multiplex a large number of high-rate streams over the same transmission resources. Using Massive MIMO over dense (small cell) deployments translates into massive throughput increases per unit area with respect to existing deployments.

Massive MIMO is also envisioned as a candidate for addressing large variations in user load, including effectively serving user-traffic hotspots. One aspect that such deployments must deal with effectively in this context is the need for load balancing, that is, the need to associate users with cells not only based on relative signal strength to the user from each cell, but also taking into account the relative user-traffic in the vicinity of each cell, with a goal to optimize network-wide performance. Load balancing is even more challenging in emerging dense deployments. First, load balancing becomes even more important with small cells, as these are inherently less planned, thus less regular than macro deployments, with large variability in effective-area coverage. Furthermore, emerging networks are multi-tier networks having tiers with BSs with vast differences in the coverage area. Indeed, load balancing algorithms need to exploit the fact that each user can be served by multiple base stations (BSs), from multiple tiers and possibly over multiple bands, in order to effectively balance the network load across all tiers bands and BS, and while taking into account the fact that BSs from each tier cover different areas and can operate on different bands.

Non-uniform load distribution is considered to be a major challenge in small cell networks. If the load cannot be balanced efficiently, the performance gains that are expected as a result of the increased density of network access points (due to use of small cells) may be distributed in a very non-uniform manner within the user population. Various load-balancing techniques have been proposed for dynamically arranging user load across small cells. These techniques are generally designed considering traditional PHY layer approaches, where one BS serves at most one user at a certain frequency and time resource. But it is well accepted by now that major gains in PHY layer are expected due to MU-MIMO and especially Massive MIMO.

The problem of designing effective load balancing and user association techniques becomes in general more challenging in cases where more than one user is scheduled at the same time and frequency resources, i.e. with multi-user transmission schemes. Indeed, the rate each user receives in the context of a multiuser transmission scheme, such as e.g., Linear Zero-Forcing Beamforming (LZFBF), depends not only on the user's own channel, but also on the number of other users scheduled together with the user for such multiuser transmission as well as the channels of these users. The problem of scheduling user sets to maximize the sum of user rate when LZFBF precoding is applied has been considered, and a greedy algorithm for the user selection when considering a single cell with a single BS has been proposed. The algorithm can be used as a building tool to schedule cellular and cluster MU-MIMO transmissions in cellular networks applying proportional fairness at each BS. These can also be systematically expanded to include a broader range of fairness conditions with a framework of virtual queues.

Scheduling methods are local in that they assume that user to BS association has already taken place, so that the fairness framework can be applied locally at each BS. Predicting a priori the effect that different user-BS associations have on the network-wide fairness provided across the network by these "locally fair" schedulers is, in general, non-trivial. However, when the number of antennas at the BS is much larger than the number of users instantaneously served by a BS in each transmission resource element, the instantaneous user rates "harden" (show much lower variability), and can be accurately predicted by just knowing the size of the serving set at the BS.

MU-MIMO User Scheduling

Although there several methods available in the literature for scheduling multi-user MIMO transmissions at the BS, a widely accepted class of methods involves scheduling policies which, at any given scheduling instant at the BS, schedule the subset of users that would yield the highest expected weighted sum-rate. Each user's expected rate in each scheduled set for transmission is a function on the instantaneous channels of all the users in the scheduled set. Indeed, assuming LZFB transmission as described in the preceding section, at any given resource block the coefficients $\lambda_k$'s depend on the instantaneous channel matrix of all users in the scheduling set (served by ZFBF), and in particular, they can be expressed as $$\lambda_{k,S}(t) = \frac{1}{\left[\vec{H}_{k,S}^H(t)\vec{H}_{k,S}(t)\right]^{-1}_{k,k}},$$

where $\vec{H}_{k,S}(t)$ denote the compound downlink channel matrix for UT-k in the user set S at the $t^{th}$ resource block. Clearly, since the choice of the user set S and/or resource block (t) affects $\lambda_k$, the expected user rates are a function of both the scheduling set and the instantaneous channel realization. Fixing the scheduling time instance, and assuming LZFBF transmission, the problem of choosing the subset S which maximize the weighted sum-rate is combinatoric in the number of antennas, as the number of possible subsets, S, that can be considered for scheduling grows exponentially fast with the maximum number of users that can be considered for joint scheduling. One solution proposed for this problem relies on a greedy algorithm for user set selection, with at most quadratic complexity.

Another important factor defining the scheduling assignments that are produced by the scheduling policy is the method by use of which the "user weights" are chosen at each scheduling instant prior to performing the weighted sum rate maximization operation. Although many methods exist for choosing these weights, a widely accepted class of methods (because of their ability to result in nearly optimal performance with respect to a fairness criterion belonging to a broad class of fairness criteria) is one that relies on the use of "virtual queues" to determine the instantaneous user-weights in the weight-sum rate optimization.

Load Balancing

Traditionally, association in cellular networks has been user-terminal based. Users measure their signal-level with respect to the beacons of the nearby base stations (BSs) and associate to the base-station with the strongest received signal. A generalization of this principle has been used in heterogeneous networks. In the case of comparing signal strengths from a macro and a small cell, a user-terminal can also apply a "bias" to favor association to the small cell (with respect to the macro cell).

As traffic-load imbalances are far more pronounced in small cells, there has been some recent work in load balancing in small cells. Indeed, small cells are much more sensitive to the cell association policy because of the non-uniformity of cell size, and the smallest average number of users they serve. This non-uniformity can result in extremely imbalanced traffic-load based on a max-SINR cell association. The prior art in this area mainly involves methods of exchanging information between each user and close-by BSs, which attempt to balance their load using signaling exchanges with nearby users. Another related technique, referred to as "cell breathing," relies on dynamically changing (contracting or expanding) the coverage area depending on the load situation (over-loaded or under-loaded) of the cells by adjusting the cell transmit power. Also note that these works focus on small cells scheduling only single-user transmissions.

The methods described above have important limitations. First, given that the user rates in a MU-MIMO, transmission is not simply a function of large-scale signal-to-interference plus noise ratio (SINR), but in general depend on the scheduling set and the channel realization. Thus, the resulting load-balancing techniques are not extendable in any straightforward resource-efficient manner. Furthermore, the nature of reciprocity-based Massive MIMO TDD makes large scale SINR in a link between a user and all BSs in proximity available given a single uplink pilot broadcast from the user. In this context, a centralized processor can determine the UT-BS associations of the user population among a set of BSs that would serve these users, without involving exchanges with the users. Using such a central controller to both perform load balancing (i.e., to balance the user load across BSs) among the BSs and to schedule transmissions at each of the BSs places computational burden to the central controller.

SUMMARY OF THE INVENTION

A method and apparatus are disclosed herein for user/base station signaling and load balancing across a wireless network. In one embodiment, the method comprises broadcasting, by a first base station in the wireless network, information indicative of the load of the first base station; receiving an association request from the user terminal for association with the first base station in response to the user terminal predicting a net throughput from the first base station, based on the information indicative of the load, being greater than net throughput from a second base station to which the user terminal is currently associated; and determining whether to accept the association request while performing an association process for selectively allowing only a fraction of requests from user terminals to associated with the base station.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
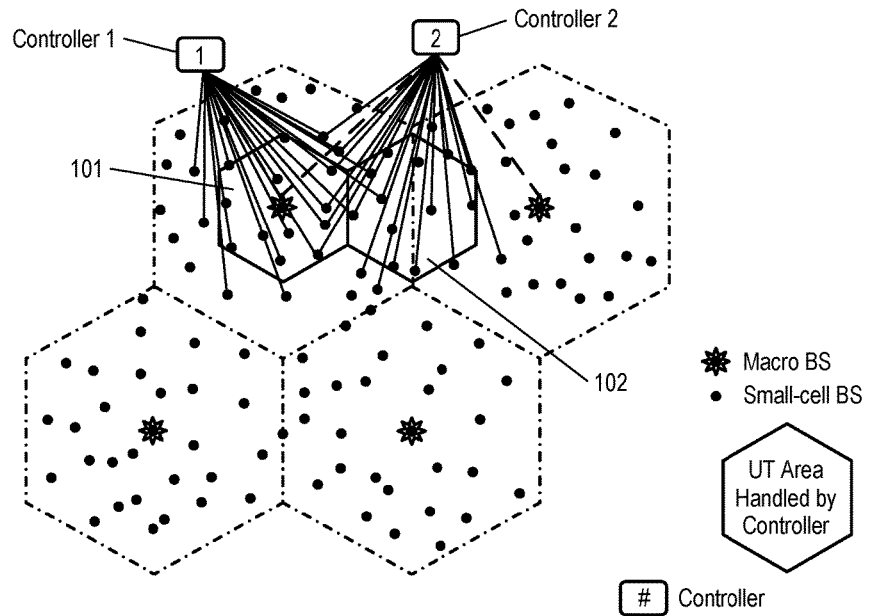
FIG. 1 illustrates one embodiment of association switching of user terminals (UTs) to base stations (BSs) in a wireless network.

Embodiments of the invention include methods and apparatuses for load balancing in single and multi-tier wireless networks involving tiers with cells of different sizes. Methods and apparatuses are described in which user terminals transmit requests to BSs for association and these requests are made based on information broadcasted that is indicative of the load in different BSs. According to one embodiment, each BS performs local admission control upon reception of such requests, admitting a fraction of the requests. In one embodiment, the fraction of users admitted by each BS is variable per BS and over time, and is decided by taking into account other information indicative of the BS current and past load and past and recent fractions of users switching to or away from the given BS.

Although the embodiments are described for use with Massive MIMO deployments engaging in single-user and multiuser-MIMO transmission based on what is referred to herein as channel-reciprocity based training, techniques described herein can be used without massive MIMO and/or without reciprocity-based training.

In one embodiment, the user terminals (UTs) make decisions and broadcast requests to be associated to BSs. In one embodiment, these decisions are made based on information that is broadcasted via the network fabric indicative of the load of each BS, and are fully selfish in that they aim at optimizing the individual UT performance (and not necessarily the performance of the network). In one embodiment, the decisions of which UTs are to be associated to which BSs is made by the network by admitting a subset of association requests made by UTs by processing a network broadcast indicative of the BS load. In one embodiment, a UT's requests aim at maximizing the (predicted) throughput that the UT would receive and the BS broadcast ensures that UTs can make such assessments accurately. Such a selective admission control process ensures a network wide efficient distribution of the load in the system.

In one embodiment, the admission control policy is local at each BS. In one embodiment, an admission control policy determines for each BS the size of a fraction and which fraction of the UTs are to be admitted to (and/or allowed to exit from) its serving-set. In one embodiment, an admission control module controls the association switching of a set of UTs across a set of BSs.

Embodiments include mechanisms for UT admission that are used in combination with information broadcasts that are indicative of the load in the network and the associated requests, selfish or otherwise, by the BSs, which can offer efficient network-wide load balancing despite the fact that each association request by a UT, in one embodiment, aims at selfishly improving, and potentially optimizing, the UT's performance.

Note that the terms "user terminal", "user equipment", "user", and "client" are used interchangeably throughout this disclosure.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Methods and apparatuses that allow efficient network-wide load balancing and scheduling over wireless heterogeneous networks with cellular massive MIMO transmission are disclosed. The architectures and associated techniques can be used for providing efficient and scalable operation over single- and multi-tier wireless networks. Examples of these networks include, but are not limited to, small cells, macro cells and heterogeneous deployments.

Embodiments disclosed herein enable effective network-wide load balancing together with user association and scheduling by exploiting interactions between user terminals (UTs) and base stations (BSs) in their proximity and local interactions among BSs and controllers. Load balancing is performed/updated periodically, as user terminals move about and enter or exit the network. In the description, however, the focus is on a single network-state instance, in order to describe the load-balancing mechanisms associated with the teachings herein. In this context, the techniques include mechanisms yielding sequences of BS-UT association pairs based on dynamic inter-BS interactions and BS-UT interactions. As these interactions are local, the load balancing mechanism is readily scalable. Also, in one embodiment, despite the fact that the choices of each UT are "selfish" and are not interested in "achieving" good network-wide performance, the combination of the information broadcasted by each BS to the user terminals and the local admission policy rules at each BS ensure near optimal load balancing and therefore efficient network-wide performance.

In one embodiment, the information broadcasted by each BS is indicative of the load of the given BS. It enables the user-terminal to estimate the effective promised net throughput it would receive if it were to switch its association to the given BS. In one embodiment, this estimate is the average rate that is predicted to be delivered to the UT over the duration of the upcoming transmission interval assuming the remaining UT-BS associations remain unchanged. This in turn enables each UT to selfishly decide and request a new association to the BS, which provides it with a particular promised or assured throughput (e.g., a highest promised throughput, second highest promised throughput, etc.

In one embodiment, the BS also provides to the UT information indicative of the mechanisms and/or processes by which the BS allocates load across its user terminals. This information enables the UT to predict the fraction of the resources that would be allocated to the UT by the BS (enabling the UT to predict the average throughput it wound receive from the BS).

Embodiments disclosed herein also include mechanisms that are implemented at each BS that, upon reception of the UT requests for establishing new associations, allow users to enter the cell (establish new associations with the BS) and/or exit the cell (terminate their association with the BS). In one embodiment, the mechanism responsible for the admission policy at a given BS uses information indicative of the current and past load levels at the BS, the current and past requests for entering and exiting the BS's cell and past honored requests by the BS, in deciding the fraction of the UTs allow to enter (and/or exit) the BS's cell. In one embodiment, the mechanism responsible for the admission policy at a given BS uses, as input, information indicative of the peak-user rates that can be provided by the BS to UTs considered for admission, such as, for example, the large-scale fading characteristics between UTs and BSs (which change slowly over time).

Methods disclosed herein also enable iterative and/or dynamic (adaptive) load balancing of resources across the network. Indeed, at each BS, in one embodiment, a local load-balancing "solution" (resource-allocation of activity fractions across user-BS pairs) is performed based on the transmission resources and based on the UTs admitted by the BS. The resulting load is broadcasted to the UTs. In turn, the UTs use this information to determine their promised net throughputs from nearby BSs and for requesting associations to nearby BSs. Also, in one embodiment, on-line load-balancing methods, which are updated from a given interval to the next interval, are also direct extensions that are used. In this case, each BS broadcasts its preceding-interval load-balancing solution, receives new requests for admission and exit, and upon brief exchanges with nearby BSs grants a fraction of these requests. Consequently, the BS redistributes its transmission resources across the new user population it is serving to better balance its load across the UTs it serves and feeds them to its scheduler. The updated transmission resources at each BS are then used by the scheduler in the BS for making scheduling assignments (i.e., for determining which pilots resources to be allocated to which users for each scheduling transmission event/resource block).

Methods and apparatuses disclosed herein allow load balancing and network-wide optimization based on a broad range of fairness criteria. In addition, although embodiments are presented in the context of reciprocity-based massive MIMO, the techniques described herein can also be applied with feedback-based MIMO techniques, with small or large-scale MIMO.

Methods for selectively admitting requests for new associations, locally at each BS, or by use of local controllers, which, in conjunction with the user-centric requests, can lead to network-wide efficient operation together, including fair operation and differentiated service, and fast adaptation to traffic variations.

Embodiments include methods and apparatuses for balancing the load in a wireless HetNet in a scalable and resource-efficient manner. Embodiments can be readily applied to perform load balancing over multi-tier networks with massive-MIMO small cells. This enables resource-efficient practical and dynamically adapted load balancing, together with low-overhead user scheduling for reciprocity-based MU-MIMO transmission.

Embodiments improve, and potentially optimize, network operation for reciprocity-based MU-MIMO over TDD single-tier and multi-tier deployments with large antenna arrays and large number of users. Furthermore, one embodiment allows load balancing across all tiers and all cells and can enable thus high multiplexing gains for all users across the network in a fair fashion. It can also be operated under the LTE fabric.

Exemplary Embodiments

Embodiments include practical scalable methods for UT-BS association and for resource allocation at each BS, which enable efficient and robust operation of single- and multi-tier wireless networks with small, large-scale, and/or massive MIMO deployments. In one embodiment, the techniques described herein rely on a load-balancing architecture that relies on the following:

Load broadcast: messages broadcasted by the BSs, which contain information indicative of the current load in one or more BS cells, as well as additional reference-signals that enable UTs to predict the net throughput from each nearby BS.

Association requests transmitted by the user terminals: these are requests by user terminals to associate with one (or more) nearby BSs.

Association-request granting mechanisms: these are made by the combined action of local admission policies of BSs and geographically dispersed controllers throughout the network. BS mechanisms are disclosed for granting selectively association requests made by the UTs so that near-optimal load balancing (e.g., Massive MIMO HetNet load balancing) can be achieved throughout the network.

The load broadcast by each BS provides information to each UT indicative of the transmission resources that would be made available to a UT by that BS if the UT were associated with this BS. In one embodiment, the load information is the number of UTs associated with the given BS. In another embodiment, the load takes into account the user fairness criterion employed by the network operator at that BS. In one embodiment, this fairness criterion comes from the class of a-fairness functions. The a value is chosen by the operator and reflects the (inherently subjective) notion of fairness employed by the operator. For example, choosing the value 1 for a implies that proportional fair scheduling (PFS) is employed by the operator: all the users associated with the BS are to be allocated an equal portion of the scheduling transmission resources of the BS, however, the fraction can vary from BS to BS as the number of users associated with different BSs can vary. In contrast, selecting a value for a larger than 1 means that the BS will provide more transmission resources to serve some UTs over other UTs. For example, the BS will provide more transmission resources to serve users with lower "peak rates" (worse channels) such as, e.g., "edge" users. In the extreme case $\alpha \to \infty$, referred to as "hard" (or max-min) fairness, the operator splits resources such that all users will be provided the same rate average-rate regardless of the channel quality. In this case, users with worse channel quality are allocated more transmission resources by the BS so that all users get the same average-throughput. In one embodiment, the BS broadcasts information indicating to each UT how to determine its "incremental load". In one embodiment, incremental load for a user is the load increase that a user will cause (or has caused) in a specific BS's load if this user gets associated with (or when this user got associated to) this BS, while the association of the other users remained the same In one embodiment, the incremental load is determined in the same well-known manner as the load is determined for the BS except that only one UT is attributing to the load (as opposed to the situation where the load of a BS is based on multiple UTs).

Embodiments described herein also include mechanisms at UTs for determining whether the UT should request new associations to one or more BSs, based on the information broadcasted by the BSs. Embodiments are disclosed in which the UT predicts the net promised throughput that the user should expect to receive from its serving BS and from one or more candidate BSs. Based on comparison of these throughputs, the mechanism decides whether the UT should keep the association to its BS as is, or to request an association with a different BS (or BSs). The UT then broadcasts this request.

Embodiments are also disclosed of association-request granting mechanisms at each BS. Upon reception of the UT requests for new associations, each BS determines what fraction of these requests to honor. In one embodiment, the requests made by UTs for new associations are inherently "selfish" and do not target optimizing the network load-balancing performance. The disclosed mechanisms at BSs allow the BSs to selectively honor the UT association requests and can yield efficient network-wide operation and effective load balancing.

Note that the disclosed mechanisms can be used with heterogeneous networks with and without massive MIMO operation. Also, proposed mechanisms are not required to heuristically "bias" associations towards small-cells as is done in conventional deployments. Indeed, this is implicitly performed in a more systematic way, where each BSs load is taken into account at each UT to request new associations.

Although not described in detail herein, straightforward extensions of the presented mechanisms can readily enable the operator to provide differentiated service to its UTs while at the same time balancing the load across the network.

In addition, although not described in detail herein, straightforward extensions of the presented mechanisms can readily enable the operator to provide network-wide fair allocation of resources across a multi-tier multi-band deployment in the case where different terminals have different "multi-band" capabilities.

FIG. 1 illustrates one embodiment of association switching of UTs to BSs. In one embodiment, UT re-association requests are enabled by controllers. Referring to FIG. 1, two areas 101 and 102 are shown, each depicting the set of UTs for which each a given controller is responsible for enabling the re-association or association switching. Specifically, controllers 1 and 2 enable the re-association or association for areas 101 and 102, respectively. In FIG. 1, each controller is connected by an edge to a subset of small and macro BSs, which could potentially serve the UTs in the geographical area served by the controller. In some embodiments, UTs make requests to BSs for association. These requests travel from these BS to the respect controller, which enables these requests. Thus, for UTs in a given area handled by a given controller, association switching is performed through interactions between the controller and the corresponding BSs.

Figure 2:
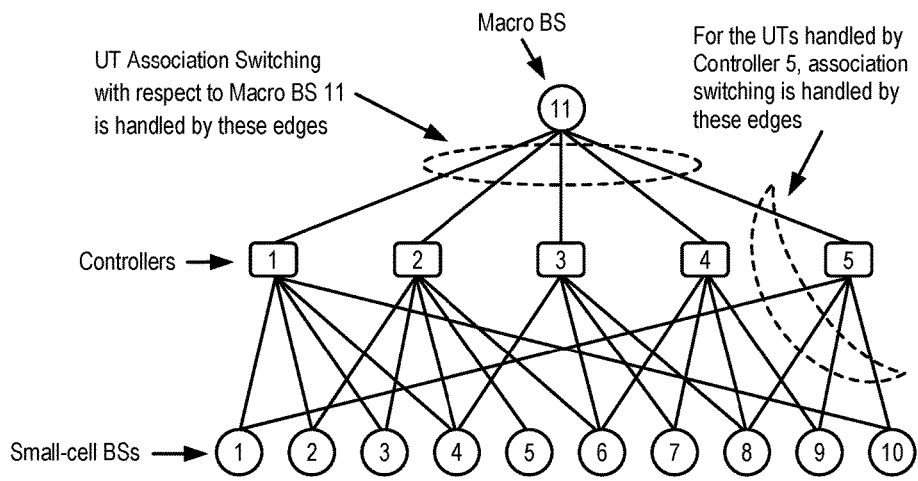
FIG. 2 is a bipartite graph for one such 1-D example of a wireless network.

In one embodiment, the interaction of BSs and controllers enabling the requests can be expressed compactly in the form of a bipartite graph. FIG. 2 is a bipartite graph for one such 1-D example. Referring to FIG. 2, a communication network involves 10 small-cell BSs, 1 macro BS and 5 controllers, and each BS shares (possibly selectively) a subset of requests for association switching with its controllers. Each controller (possibly selectively) enables a subset of the requests for association switching on UTs handled by the controller. In one embodiment, each such association switch is performed along the edges between the controller and the corresponding BSs (i.e., the departing and new association BSs). Note that, in general, the "load balancing solution," i.e., the resource allocations of BS resources to UTs, has to be re-updated periodically, since UTs move and the traffic load distribution changes over time.

Figure 3:
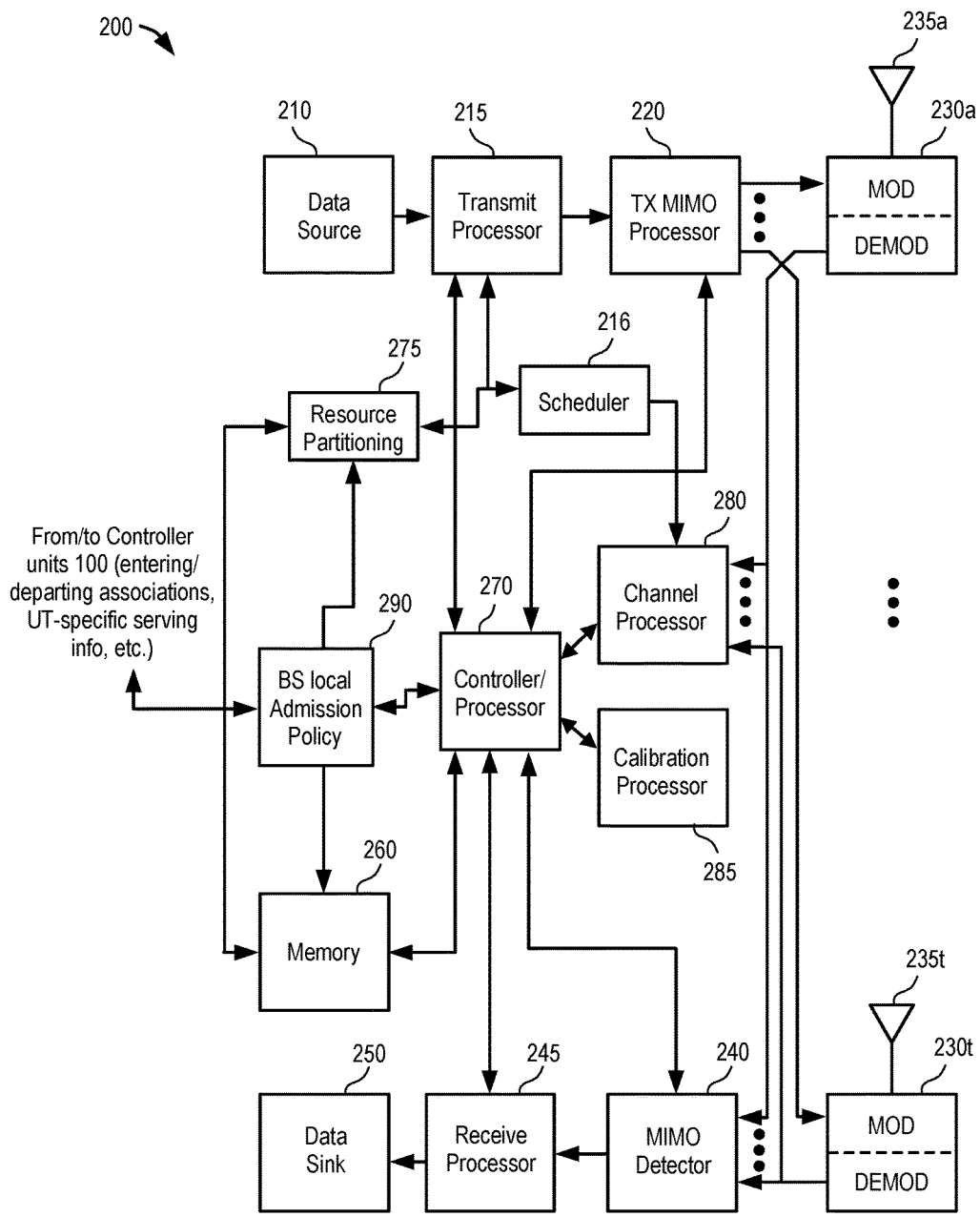
FIG. 3 is a block diagram of one embodiment of a BS.

FIG. 3 is a block diagram of one embodiment of a BS. Referring to FIG. 3, BS 200 includes standard modules for MIMO wireless transmission. A transmit processor 215 at BS 200 receives data for one or more UTs from a data source 210, processes the data for each UT and provides data symbols to all UTs. Processor 215 also receives and processes control information from a controller/processor 270 and provides control symbols. Processor 270 also generates reference symbols for one or more reference signals. A transmit (TX) MIMO processor 220 performs precoding on the data symbols, the control symbols, and/or the reference symbols for each UT as well as for reference signals for antennas co-located at the same BS 200 or to other wireless entities such as other BSs, remote radio heads (RRHs), etc.

Processor 220 provides parallel output symbols streams to modulators (MODS) 230a through 230t. Each modulator 230 further processes (e.g., convert to analog, amplify, filter, and upconvert) the output sample stream to obtain a downlink signal. The downlink signals from modulators 230a through 230t are transmitted via antennas 235a through 235t, respectively.

At BS 200, the uplink signals from various UTs or by other antennas, collocated at the same BS 200 or located at different BS s or other wireless entities, are received by antennas 235a through 235t and demodulated by demodulators (DEMODs) 230a-230t. The demodulated signals are detected by MIMO detector 240 and further processed by a receive processor 245 to obtain decoded data and control information sent by UTs and other wireless entities. Receive processor 245 receives detected signals from MIMO detector 240 and provides decoded data to a data sink 250 and control information to controller/processor 270. The demodulated signals output by DEMODs 230a through 230t are also provided to channel processor 280 where the uplink channel is estimated and provided to controller/processor 270.

In one embodiment, BS 200 also includes a calibration processor 285. Calibration processor 285 exchanges control information with controller/processor 270. In one embodiment, calibration processor 285 calculates calibration values, which may be used at controller/processor 270 together with uplink (UL) channel estimation to construct a downlink channel estimation, which is provided to TX MIMO Processor 220 for precoding. In one embodiment, processing at calibration processor 285 involves both the signaling and data collection aspects of calibration as well as the relative calibration methods, which are based on the collected data, and, possibly additional parameters, including past relative calibration values for arbitrary subsets of the transmit antenna nodes at this and possibly other BSs.

In one embodiment, BS 200 also includes scheduler 216. Scheduler 216 exchanges scheduling information with transmit processor unit 215. According to this information, transmit processor 215 requests the data of the scheduled users from data source 210. Scheduler 216 also provides the information of which uplink channel estimates belong to which users to channel processor 280. Scheduler 216 processes the information provided by one or more controllers, such as a controller in FIG. 2. The information provided by the one or more controllers includes activity fractions, various scheduling constraints, re-use constraints. In one embodiment, the scheduler units of different BS communicate with each other in order to enable feasible, non-overlapping transmissions at each instant. Scheduler 216 takes input from resource partitioning (allocation) unit 275. Resource partitioning unit 275 takes, as input from BS local admission policy unit 290, the list of UTs that are currently associated to the BS, and possibly information indicative of UT-specific service differentiation. In turn, resource partitioning unit 275 determines activity fractions to be provided to each UT associated with the BS. In one embodiment, this determination is performed according to the fairness objective chosen by an operator of the BS.

In one embodiment, BS local admission policy unit 290, which determines the local admission policy at the BS is as disclosed herein.

System Model

Next the load-balancing architectures and methods disclosed herein are described in detail. Without loss of generality, the focus herein is on the following scenario involving J BSs/APs (the terms BS and AP are used interchangeably herein) serving K single antenna UTs, spread over a potentially very large geographical area. UTs and BSs are indexed by the indices k and j, respectively, with k from the UT set $K=\{1, 2, \ldots, k\}$ and j in the BS/AP set $J=\{1, 2, \ldots, J\}$.

Assume that $BS_j$ has $M_j$ antennas and serves UT sets of size $S_j$ via (cellular) linear zero-forced beamforming (LZFB) (with equal-power per stream). Also assume that $S_j \ll M_j$ so the massive MIMO approximations apply, i.e.:

A user's instantaneous rate, when BS, is serving a specific set of $S_j$ UTs (that includes this UT), is (approx.) the same regardless of the channel realization.

A user's instantaneous rate, when the UT is served by BS, in a group of $S_j$ UTs, effectively depends only on the value of $S_j$, and not on the identity of the other $S_j-1$ UTs.

In one embodiment, with LZFBF, the peak rate that $UT_k$ gets (i.e., the rate that the UT gets when it is scheduled for transmission), when it is served by BS, in group of $S_j$ is as follows:

$$R_{k,j} \approx \log\left(1 + \frac{g_{k,j}(M_j - S_j + 1)P_j/S_j}{1 + \sum_{i \neq j} g_{k,j} P_i}\right)$$

where $g_{k,j}$ denotes the large-scale received SNR between $BS_j$ and $UT_k$ (e.g., the ratio of the received signal power divided by the thermal-noise variance per resource element), and $P_j$ denotes the transmit power per resource element from $BS_j$.

The notation $J_k$ is used to denote the set of BSs, which can serve $UT_k$ (the elements in this set are, e.g., the BSs with sufficiently high large-scale SINR to $UT_k$). Similarly, the notation $K_j$ is used to denote the set of UTs that can be served by $BS_j$ (the elements in this set are, e.g., the UTs with sufficiently high large-scale SINR from $BS_j$).

Load Balancing and Activity Fractions

For reference, a brief description is included of the problem solved by the methods disclosed in D. Bethanabhotla et al, "Method and Apparatus for Scheduling, Load Balancing, and Pilot-Assignments in Reciprocity-Based MIMO Cellular Deployments," Provisional Patent Application No. 61/914,319, filed December 2013 and PCT Application No. PCT/US2014/068323, filed Dec. 3, 2014 (hereinafter Bethanabhotla 1).

The methods in Bethanabhotla 1 provide a load balancing solution by use of a single controller performing the load balancing optimization across all BSs. Let $a_{k,j}$ denote the activity fraction by which user k is served by $BS_j$ in LZFB transmission. The problem solved by the methods in Bethanabhotla 1 is listed below.

A problem solved by centralized load-balancing controller in Bethanabhotla 1:

$$\text{maximize} \sum_{k \in \mathcal{K}} U\left(\sum_{j \in J_k} a_{k,j} R_{k,j}\right) \qquad \text{(Centralized a)}$$

subject to $$\sum_{j \in J_k} a_{k,j} \leq 1 \quad \forall k \in \mathcal{K} \qquad \text{(Centralized b)}$$

$$\frac{1}{S_j} \sum_{k \in \mathcal{K}_j} a_{k,j} \leq 1 \quad \forall j \in J \qquad \text{(Centralized c)}$$

$$a_{k,j} \geq 0 \quad \forall k \in \mathcal{K}, \forall j \in J_k \qquad \text{(Centralized d)}$$

The function U in (Centralized a) captures a notion of "fairness". In one embodiment, the function U is from the class of a-fairness functions for some $\alpha \leq 0$ which is well-known in the art. For more information, see J. Mo and J. Walrand, "Fair end-to-end window-based congestion control," IEEE/ACM Transactions on Networking (ToN), vol. 8, no. 5, pp. 556-567, 2000 (hereinafter "Mo"). For instance, proportional fairness is obtained if a is chosen equal to 1. Also in the case $\alpha \to \infty$, the "Hard Fairness" criterion is obtained, in which the objective function to be maximized in (Centralized a) becomes the minimum among all the provided user rates.

The constraints according to one embodiment are as follows:

The set of inequalities (Centralized b) reflects that each UT's total activity fraction (over all BSs) cannot be more than one (achieving the bound with equality means that a user is served in every resource element by one of the BSs).

The constraints in (Centralized c) reflect the fact that the sum activities of all the users being served by $BS_j$ cannot exceed $S_j$ i.e., $S_j$ times the total available transmission resources (this is because $BS_j$ serves $S_j$ at a time).

The constraint in (Centralized d) which just reflects that the activity fractions must be greater than or equal to zero.

Note that for any set of activity fractions satisfying the constraints (Centralized b)-(Centralized d), it is possible to obtain scheduling assignments (over a sufficiently large number of resource blocks) for scheduling UTs for cellular transmission, so that, for each k and j, $UT_k$ is scheduled for transmission by $BS_j$, in about $(100 \times a_{k,j})$ % of the resource blocks scheduled by $BS_j$. Consequently, the rate provided to $UT_k$ by the network of BSs, by such a scheduling policy is given by $$\bar{R}_k = \sum_{j \in J_k} a_{k,j} R_{k,j}$$

Although the treatment in Bethanabhotla 1 includes the classical case, where each UT is associated and served by a single BS (and where, for any given k, the activity fraction $\alpha_{k,j} > 0$, only for single value of j), it also allows the use of scheduling strategies where a UT may be fractionally served by multiple BSs, i.e., it may get different fractions of its total rate from multiple BSs (being served in distinct resource blocks in each case). Furthermore, although the unique UT-BS association constraint is practically attractive, its relaxation to allow fractionally served UTs described by the set (Centralized a)-(Centralized d) corresponds to a convex problem. Also, although the solution of the set (Centralized a)-(Centralized d) may point to a "fractional association," such a solution is feasible (implementable), in that, as shown in Bethanabhotla et al, "User Association and Load Balancing for Cellular Massive MIMO," in Proc. of Inform. Theory and Applications Workshop, ITA 2014, San Diego, Calif.; available at http://ita.ucsd.edu/workshop/14/files/paper/paper_1660.pdf (Bethanabhotla 2), there exist deterministic scheduling rules to schedule each UT so that the UT activity fractions to each BS comply with the solution of the set (Centralized a)-(Centralized d), and the UT is not scheduled by multiple BSs in the same resource block.

In one embodiment, the problem described by the set (Centralized a)-(Centralized d) can be solved by existing general-purpose convex optimizers or special purpose methods that are well-known in the art. For more information, see e.g., Bethanabhotla 2.

Methods disclosed herein also provide solutions to the problem described by the set (Centralized a)-(Centralized d), while relying on an association architecture that differs from the one assumed in Bethanabhotla 2. Specifically, unlike the methods in Bethanabhotla 2 where all the information is available at the network fabric to perform user-BS association and resource allocation, methods described herein perform user-BS association via user-based requests for association and local admission control policies at the BS.

Intrinsically letting the UT choose the "best" BS to serve the UT is a "selfish" action. Note however that if each UT picks its association based on what each UT thinks is the best serving BS for the UT and the network honors every UT's request, the resulting set of associations may be highly suboptimal. This is true for example if each UT selects the serving cell based on the best peak rate (rate obtained when the UT is scheduled). Indeed, as shown in Bethanabhotla 2, this approach may result in large variations in the load across BSs, i.e., the number of UTs associated with each BS. UTs in hotspots can thus suffer in these cases, since they may be served a very small fraction of time, and although they may get high rates within each scheduling event that they are scheduled, overall they may receive very low rates. Techniques that periodically broadcast to the UTs the load of all nearby BSs can enable each UT to make a more accurate assessment of the net rates the UT can receive from nearby BSs. In particular, the UT can use the most recent broadcasted BS-load provided by the BS broadcast, and it's the UT's estimate of the peak rate that the UT can receive from the BS (based on the UT-BS large-scale channel conditions) and use that to estimate the net rate promised a given BS. However, letting each UT switch to the BS "promising" the highest net rate need not converge towards good network-wide system performance. As shown in Bethanabhotla 2, if each UT requests to switch their association to the BS with the highest promised rate probabilistically, it is possible over time for the system to reach near-optimal performance. In particular, assume that at each instance a user flips a coin, and the UT switches to the best BS if the coin comes up heads, and stays in his current association otherwise. If the probability of "heads" is small enough, as illustrated in Bethanabhotla 2, the system will converge to an equilibrium "Nash state" (where every UT is happy not switching) which happens to be in this case nearly optimal. Note that in one embodiment, such a "flip of a coin" is merely an analogy for any well-known pseudo random number generation process that can be used to implement the selection.

The limitation of the UT-centric method implied in Bethanabhotla 2 is that they rely on having UTs decide their association. UTs determine in each cycle their preferred BS and only request to switch probabilistically. However, switching probabilistically is not the best choice for an individual user. Consider for example the decision of a UT labeled as user 1 and assume that all the other UTs switch with a small probability. If user 1 also switches with the same small probability and that common probability is small enough, the system will eventually reach equilibrium and near-optimal performance. The problem however is that user 1 has an incentive to immediately switch as in that case the UT will get to its optimal BS faster than if the UT switches probabilistically. As a result, all UTs would want to switch with probability 1 (i.e., immediately) if a BS offers them higher promised rate. However, if all UTs follow this approach, the system will typically not converge to a near optimal equilibrium state. Instead, the BS-loads will typically fluctuate from one cycle to the next, as large fractions of UTs change associations from one association cycle to the next, yielding sub-optimal and in fact very poor performance.

Methods disclosed herein include an admission control mechanism at each BS, which controls the number of UTs that enter and when properly can enable near-optimal network performance. In one embodiment, the admission control mechanism in the BS also controls the rate of association requests that are granted in each cycle in such a way to optimize the rate of convergence to near-optimal network-wide performance. This is important in the context of the practical deployments where UTs move around and/or enter and exit the system so the system solution needs to be constantly adapting. Furthermore, the admission policies described herein can be appropriately extended to provide differentiated service.

Figure 4:
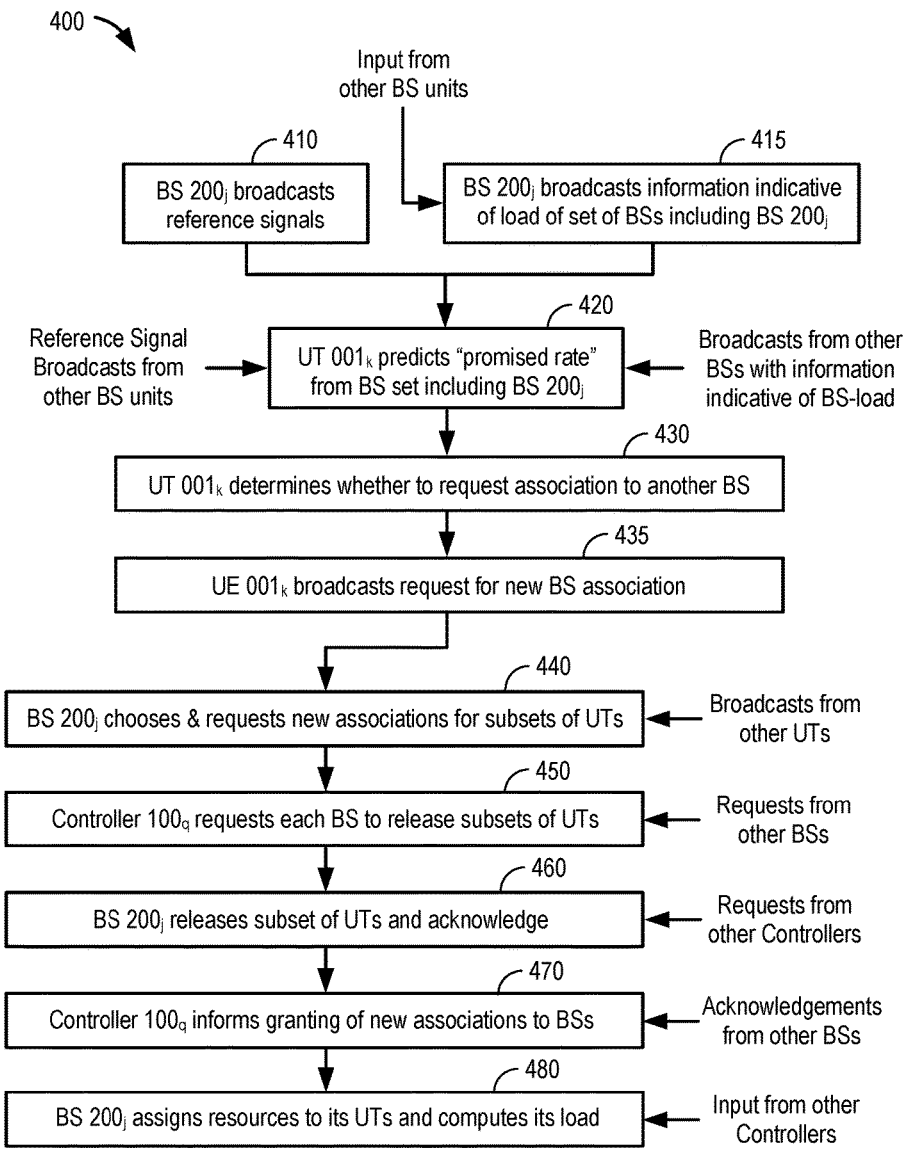
FIG. 4 is a flow diagram for one embodiment of a process for handling associations and re-associations.

FIG. 4 is a flow diagram for one embodiment of a process for handling associations and re-associations. The process is performed by processing logic that may comprise hardware (circuitry, dedicated logic, etc.), software (such as is run on a general purpose computer system or a dedicated machine), or a combination of both.

Referring to FIG. 4, in one embodiment, each BS periodically broadcasts reference signals (processing block 410). In one embodiment, the reference signals are pre-coded. Upon reception of these signals, the UTs can obtain information about the large-scale signal strength between any nearby BS and the UT.

As shown in FIG. 4, the network also periodically broadcasts information indicative of the load of different BSs (including BS $200_j$) in the system (processing block 415). In one embodiment, the network also broadcasts other information such as, for example, but not limited to, the number of streams that can be served simultaneously by any given BS, the beamforming gain that can be expected to be provided by each BS (which is a factor of the antenna array size and form), as well as the fairness criterion applied by the BS across the UTs it shares.

Upon reception of these broadcasts, each UT (including UT $001_k$ predicts the rate that the UT would receive when scheduled for transmission by the given BS. Furthermore, using knowledge of the BS load and the fairness criterion used by the BS enables the UT to predict the fraction of resources that it should expect to be allocated by the BS, and in turn predict the net rate "promised" by each of the nearby base-stations (processing block 420). If a UT (such as UT $001_k$) predicts that any of the nearby BSs promise a higher net throughput than the BS currently serving the UT (processing block 425), the UT requests a new association to the BS predicting the higher rate via an UL transmission (processing block 430).

Upon reception of all the switching requests by UTs that wish to switch a given BS (such as BS $200_j$), the given BS applies its admission policy (processing block 440) upon which it grants a subset of these requests. The BS then provides these requests to the appropriate controllers, such as Controller $100_q$ (processing block 460). Each controller entity (including controller entity $100_q$) collects such requests from nearby BSs, and for the subset of UTs that it is handling, it informs the associated BS of the changes of the UT-BS associations (processing block 470). Subsequently, each BS assigns resources to its UTs and updates its BS load (processing block 480). Subsequently, this load information is used for new broadcasts from the network, which will provide information to the UTs of the updated load information for that BS for the next cycle (processing block 415).

To simplify the exposition of embodiments, in one embodiment it is assumed a "full buffer" scenario, in which the network has data for all the UTs in the system. Without loss of generality and for ease of exposition, in one embodiment it is assumed that a sufficiently "loaded" system, where the number of UTs to be served (on average) per BS is much larger than the number of UTs that can be simultaneously served within each resource block by each BS. Also assumed is that the operator has chosen as a performance metric (for evaluating the quality of the users-BS association and scheduling allocations in the network) a utility metric from the class of a fairness functions (e.g., those in Mo), and has chosen a particular α value. Let $R_{k,j}$ denote the peak rate that user k gets from $BS_j$ when the UT is scheduled for transmission, and letting j* denote the UT's current serving BS. Let also $K_j$ denote the set of UTs currently served by $BS_j$. As shown in Bethanabhotla 2, the optimized allocation of resources at $BS_j^*$, yields to user k (served by $BS_j^*$) a fraction $$a_{k,j^*} = \frac{S_{j^*} R_{k,j^*}^{\rho-1}}{\sum_{n \in K_{j^*}} R_{n,j^*}^{\rho-1}}$$

of scheduling resources. In the loaded scenario of interest, the number above is smaller than 1. (In an unloaded setting, if the above equation yields a number larger than 1, the number has to be clipped to 1 as a UT cannot be served more than all the time). Identifying the "incremental load" for user k as load as $I_{k,j e^*} = R_{k,j^*}^{\rho-1}$, and the total load of BSj* as $$L_{j^*} = \sum_{n \in K_{j^*}} R_{n,j^*}^{\rho-1},$$

the fraction of resources provided by $BS_j^*$ to user k can be expressed as $$a_{k,j^*} = \frac{S_{j^*} I_{k,j^*}}{L_{j^*}}$$

and the net rate provided by $BS_j^*$ to user k can be expressed as $$r_{k,j^*} = a_{k,j^*} R_{k,j^*} = \frac{S_{j^*} I_{k,j^*}}{L_{j^*}} R_{k,j^*}$$

In one embodiment, three main components operate together. The first component involves a network broadcast (as shown in processing blocks 410 and 415). BSj broadcasts information indicative of the BS load parameters, $L_j$, information indicative of the user-multiplexing BS parameters, $S_j$. In one embodiment, other parameters include the a value (fairness criterion) used by the operator, and information indicative of the beamforming gain that can be provided by the BS.

The second component involves the mechanism used at each UT for determining the new preferred UT-BS association. Based on the information available to the UT by the network broadcast in the first component, user k computes the incremental load, $I_{k,j}$, that the UT would incur if it were to switch its association to nearby $BS_j$, and the corresponding "predicted" new load at $BS_j$ as $L_j + L_{k,j}$, and consequently computes the promised rate from each $BS_j$ in the next cycle as $$\tilde{r}_{k,j^*} = \begin{cases} \frac{S_j I_{k,j}}{L_j} R_{k,j} & \text{if } j = j^* \\ \frac{S_j I_{k,j}}{I_{k,j} + L_j} R_{k,j} & \text{otherwise} \end{cases}$$

Upon comparison of the net rates predicted from different BSs, the UT determines the index of the BS that can provide to it the highest predicted net rate, i.e.:

$$j^*_{new}(k) = \underset{j}{\arg\max}\, \tilde{r}_{k,j}$$

If this index above is different from the index of user k's currently serving BS, i.e., if $j^*_{new}(k)$ differs from j*, user k requests an association change to the BS promising it the highest net rate, i.e. BS $j^*_{new}(k)$.

Figure 5:
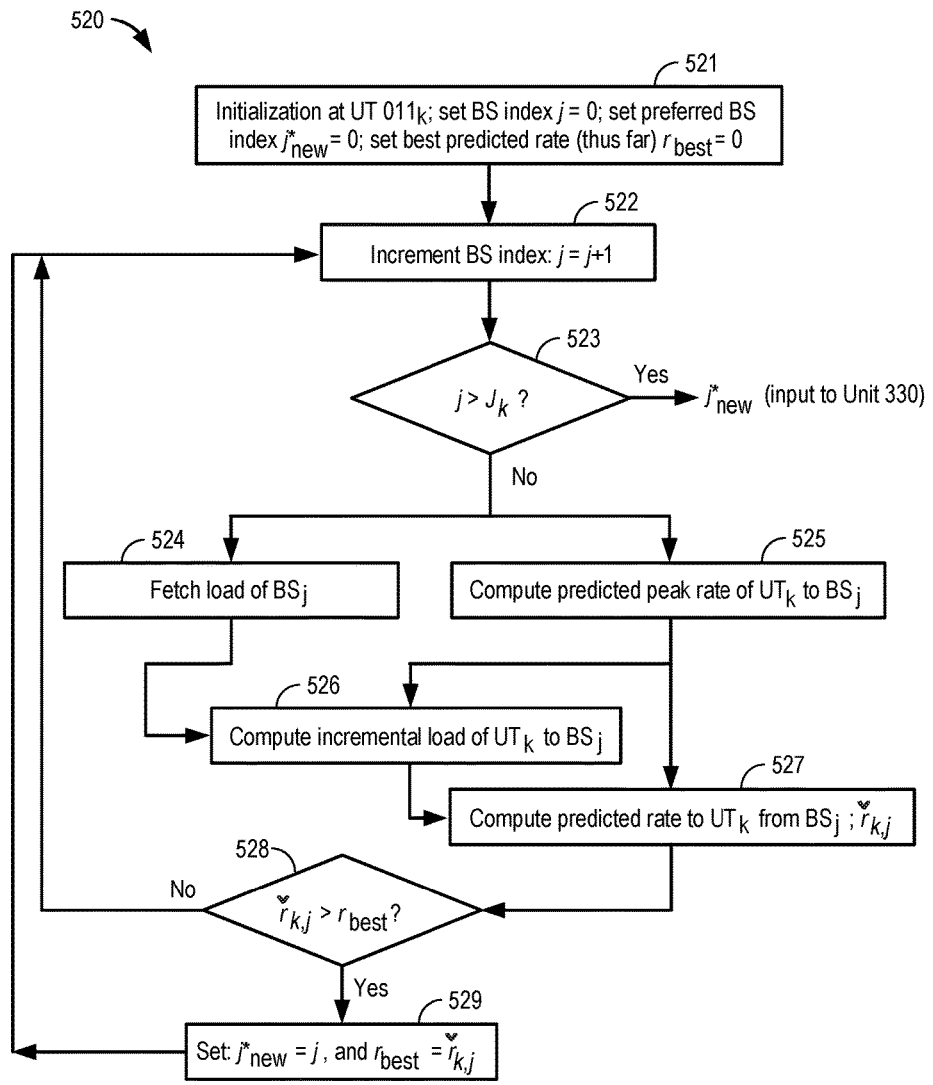
FIG. 5 is a flow diagram of a process for determining the new preferred UT-BS association.

FIG. 5 is a flow diagram of a process, performed by a mechanism at a UT (e.g., user terminal $001_k$), for determining the new preferred UT-BS association. The process is performed by processing logic that may comprise hardware (circuitry, dedicated logic, etc.), software (such as is run on a general purpose computer system or a dedicated machine), or a combination of both.

Referring to FIG. 5, based on the information available to the user terminal $001_k$ (referred to as $UT_k$) by the network broadcast and the network reference signals in the first component (processing blocks 410 and 415 in FIG. 4) $UT_k$ determines its new preferred association BS as $j^*_{new}(k)$ and provides it to the BS.

In the embodiment depicted in FIG. 5, all nearby BSs (nearby to $UT_k$) are re-indexed from 1 to $J_k$, and $UT_k$ goes through the list of BSs, one at a time, to determine $j^*_{new}(k)$, that is, the BS that can provide to the UT the highest net throughput (as predicted by the UT based on the information available to it).

Referring to FIG. 5, the indexes of base-station currently being checked, j, the best base station found thus far, $j^*_{new}(k)$, and the best rate predicted so far, $r_{best}$, are all initialized with the value 0 (Unit 521). Then starting with the index j=1, for each j index value, the UT obtains a prediction of the peak rate of the UT k from $BS_j$ (processing block 525), computes the incremental load of $UT_k$ to $BS_j$ (processing block 526) and obtains a prediction of the net throughput that it may expect if served from $BS_j$ (processing block 527). If that value is larger than the best net throughput found so far, as determined at processing block 528, the UT replaces the value of the best throughput so far, and the best index found so far is updated to j (processing block 529). Once all the base stations are checked (i.e., when the comparison in processing block 523 becomes true), the value of $j^*_{new}(k)$ is provided as input to processing block 430 in FIG. 4.

Note that, in one embodiment, the UT predicts the net throughput from $BS_j$, by multiplying the predicted peak rate from $BS_j$ by the fraction of transmission resources over which it expects to be served by $BS_j$. In one embodiment, this fraction of resources is readily computed via the incremental load induced by the UT to $BS_j$ (computed in processing block 526) the load of $BS_j$ (fetched by processing block 524) and the number of UTs simultaneously served by $BS_j$ in each scheduling instance. In one embodiment, the peak rate provided to $UT_k$ is obtained by estimating the large-scale SINR between the UT and the BS at the time of transmission. In one embodiment, this large-scale SINR is obtained as the ratio of a signal term over a noise plus interference term. In one embodiment, the signal term is obtained by multiplying the large-scale received signal power estimate from $BS_j$ to $UT_k$ (as predicted by estimating the power of the reference signals transmitted according to processing block 410), with the beamforming gain that is to be provided by the BS. In one embodiment, the beamforming gain can be explicitly broadcasted by the network. Alternatively, information indicative of the beamforming gain can be broadcasted or be made known (e.g., the number of antennas at $BS_j$ and potentially the antenna design parameters.), which may allow the UT to locally infer the expected beamforming gain. The interference power term corresponds to the sum of the large-scale received signal powers at $UT_k$ from all other nearby BSs (as predicted by estimating the power of the reference signals from the respected BSs, broadcasted according to processing block 410).

The third component is the admission control mechanism at each BS. In one embodiment, at a given BS, the admission control processor "flips a coin" (e.g., uses a pseudo random number-based process to select) for each UT requesting admission, to decide whether to admit that UT to its serving set. If all the BSs use the same probability of "heads", then this scenario has the same net effect as the approach in Bethanabhotla 2, where all UTs have the same probability of "heads" to decide whether to request a switch to the BS with the higher promised net rate (and where it is assumed the request is granted). As a result, if all the BSs use the same probability of "heads" (corresponding to admitting the UT) is small enough, the system will converge to an equilibrium "Nash state" (where every UT is satisfied and does not wish to switch) which correspond to nearly optimal load balancing. In another embodiment, the admission control processor makes decisions based on user traffic, quality and service requirement, etc.

Figure 6:
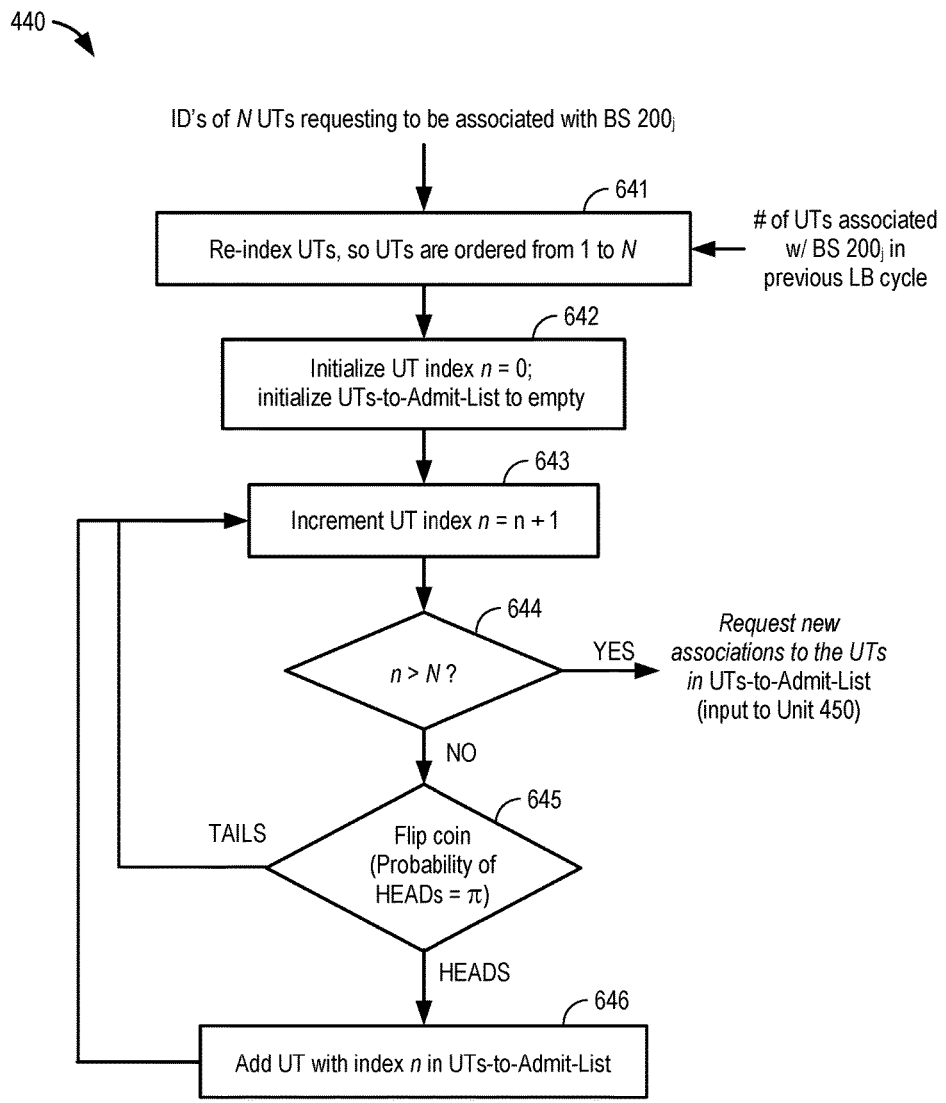
FIG. 6 is a flow diagram of one embodiment of a process for admitting the requests of UTs to switch their BS association to another BS.

FIG. 6 is a flow diagram of one embodiment of a process for admitting the requests of users to switch their BS association to BS $200_j$. The process is performed by processing logic that may comprise hardware (circuitry, dedicated logic, etc.), software (such as is run on a general purpose computer system or a dedicated machine), firmware, or a combination of the three.

Referring to FIG. 6, processing unit 440 takes, as inputs, the IDs of the UTs requesting association to the given BS and outputs a list of the user IDs to which it wishes to grant association permission. The process begins by processing logic re-indexing the UTs so that they are ordered 1 to N (processing block 641). In one embodiment, the group of UTs includes the number of UTs associated with the BS in the previous load balancing cycle.

Next, processing logic initializes the UT index n to zero and empties the UTs-to-Admit List (processing block 642). Then, processing logic increments the UT index n by one (processing block 643) and tests when the UT index n is greater than the number N of UTs requesting association (processing block 644). If the UT index n is not greater than the number N of UTs requesting association, processing transitions to processing block 645 where processing logic "flips a coin" to determine if the particular UT is to be added to the UTs-to-Admit List. If it is Tails, processing transitions to processing block 643 where the process repeats for the next UT. If its Heads, processing transitions to processing block 646 where processing logic adds the UT with index n to the UTs-to-Admit List and then transitions to processing block 643 where the process repeats for the next UT. If the UT index n is greater than the number N of UTs requesting association at processing block 644, then processing logic requests new associations to the UTs in the UTs-to-Admit List.

Note that in one embodiment, not all choices for an admission probability $\pi$ will lead to locally optimal performance or even convergence. For example, consider a static HetNet Massive MIMO network with a common $\pi$ value across the network. Simulations suggest that sufficiently small $\pi$ values lead eventually to convergence to near-optimal network wide performance, and the smaller the value of $\pi$, the slower the convergence. However, using large $\pi$ values leads to unstable oscillatory behavior, far from optimal. In one embodiment, the value of $\pi$ C is selected small enough so as to obtain convergence but large enough so as to ensure fast adaptation to changes in the network traffic.

In one embodiment, the admission probability $\pi$ is locally adapted at each BS so as to strike a balance between ensuring convergence and fast adaptation. In one embodiment, in updating the value of $\pi$, the BS processor can take additional inputs, including the base-station's load levels in the current and in recent past load-balancing cycles, the numbers of requests received for new associations in the current and in past load-balancing cycles, the numbers of new-association requests granted in past load-balancing cycles, and the number of UTs that switched their association from the current BS to a new BS in past load-balancing cycles. In one embodiment, the load information may be a vector including information indicative of load for different classes of service.

In one embodiment, the BS outputs are made available to one or more controller entities, as shown in the examples of FIG. 1 and FIG. 2. In one embodiment, each controller entity ensures that the UT association switches to different BSs are granted. In one embodiment, involving operation over multiple bands and/or differentiated service in which a user is allowed to connect to multiple BSs (e.g., on different resource blocks in the same frequency band) or over different bands (e.g., on carrier aggregation), the controller entity ensures that the user is properly served jointly by multiple BSs or multiple bands. In this case, in one embodiment, the controller selectively honors a subset of the UTs association requests based on the operator's notion of fairness. For example, from the point of view of a UT, it is beneficial to receive service from as many different bands as its modem can allow. Obtaining such service from multiple bands simultaneously is often referred to as carrier aggregation. Although the benefits of carrier aggregation are desirable from every single UT, from the point of view of the network, it might be desirable to allow a UT to operate on only a single band. The controllers can ensure that carrier aggregation is dealt properly by the network.

In one embodiment of the first component, the BS-load information is broadcasted by the macro tier. In one embodiment, the BS-load information is locally broadcasted by the small cells. Indeed, a local single-frequency-network concept can be locally applied by the small-cells that can provide macro-diversity to the broadcast signals. In one embodiment of the second component, a UT may also use information obtained from previous network broadcasts as well as previous requests the UT has made for association.

Figure 7:
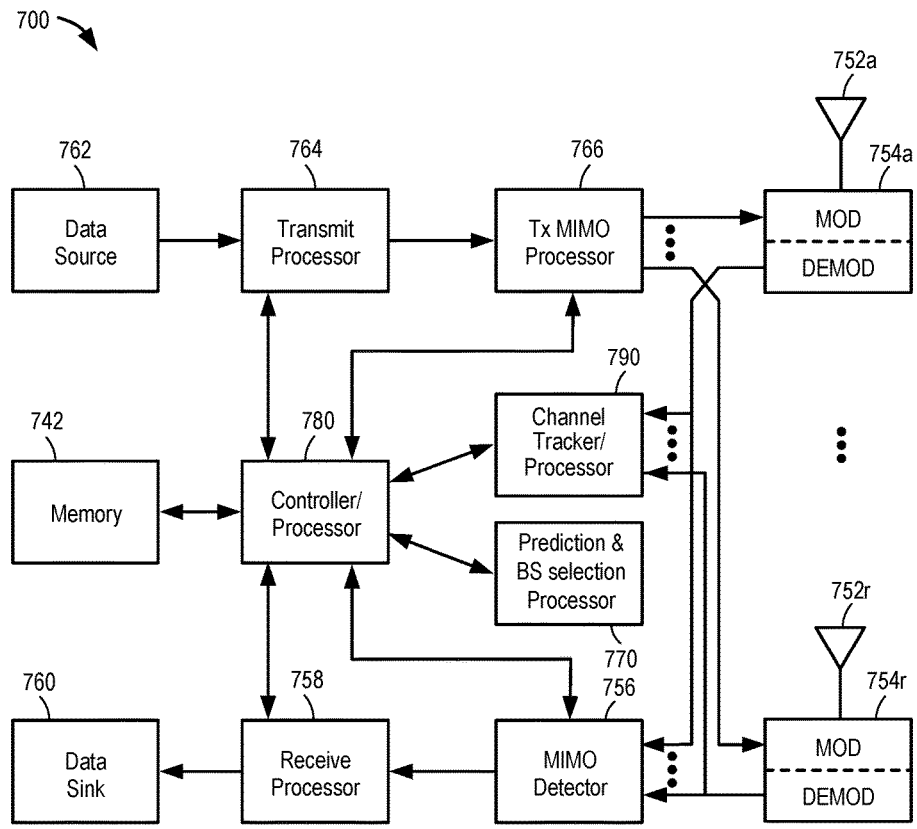
FIG. 7 is a block diagram of one embodiment of a user terminal.

FIG. 7 is a block diagram of one embodiment of a user terminal with more than one antenna. In one embodiment, the UT has a single antenna, for the sake of generality. In one embodiment, the UT has MIMO capability, but this is not a requirement. Referring to FIG. 7, UT 700 includes standard modules for wireless transmission, including, for example, antennas 752a through 752r which receive downlink signals from a base station and provide received signals to demodulators (DEMODs) 754a through 754r, respectively. In one embodiment, each demodulator 754 conditions (e.g., filter, amplify, downconvert, and digitize) its received signal to obtain input samples. In one embodiment, each demodulator 754 further process the input samples (e.g., for OFDM, etc.) to obtain received symbols. A MIMO detector 756 obtains received symbols from all R demodulators 754a through 754r, performs MIMO detection on the received symbols if applicable and provides detected symbols. A receive processor 758 processes (e.g., demodulate and decode) the detected symbols and provides decoded data for the UT to a data sink 760 and provides decoded control information and system information to a controller/processor 780. On the uplink, at the UT, transmit processor 764 receives and processes data from a data source 762 and control information from a controller/processor of a BS (Unit 270 in FIG. 3). In one embodiment, processor 764 also generates reference symbols for one or more reference signals.

In one embodiment, UT 700 also has a channel processor block to process the reference signals sent by the BSs. The processed signals are provided to a Prediction and BS selection processor 770 in FIG. 7.

In one embodiment, prediction and BS selection processor 770 makes throughput predictions and BS selections and association requests as disclosed herein. In one embodiment, prediction and BS selection processor 770 predicts net throughput from one base station based on the information indicative of the load and determines whether the predicted net throughput is greater than the one provided by the base station to which it is currently associated. In one embodiment, prediction and BS selection processor 770 predicts net throughput from one base station by predicting transmission resources that the first base station is to allocate to the user terminal. In one embodiment, the information regarding the transmission resources that that one base station is going to allocate for the user terminal is obtained from that load information associated with that one base station and received by the user terminal and fairness criterion employed at that base station in granting association requests.

In one embodiment, prediction and BS selection processor 770 predicts net throughput from the one base station by predicting the rate the user terminal is expected to receive from the one base station during at least one scheduling event. In one embodiment, prediction and BS selection processor 770 predicts the rate the user terminal is to receive from the one base station during at least one scheduling event based on reception of at least two distinctly precoded reference signals broadcasted by the one base station.

UT 700 uses its transmitter (e.g., transmit processor, transmit MIMO processor, modulator and antenna) to transmit an association request to request association with the base station that prediction and BS selection processor 770 selects as the base station that is going to provide it greater throughput than the base station to which it is currently associated.

Reference Signaling Enabling UT to Estimate their Peak Rates at Higher Frequencies One distinction between the centralized load-balancing methods disclosed in Bethanabhotla 1 and the conventionally used SINR-based schemes for assigning users to BSs is the implied mechanism that determines UT-BS association. Unlike the SINR-based scheme (as well as several other load-balancing schemes proposed in the literature), where such association is user-centric (decided by the UT), the centralized load-balancing methods in Bethanabhotla 1 suggest the use of a network-centric association, i.e., they imply that UT-BS association is decided by the network. In one embodiment, there is also a desire to have BS-UT association methods such as those disclosed herein, which rely on UTs requesting association based on control signals broadcasted by BSs. Indeed, conventional user-centric schemes rely on association based on beacons broadcasted by the BS. At the higher frequencies where the massive-array small cells would be possible, the harsher pathloss attenuation severely limits the range of the beacon broadcast. Note that this does not apply to data transmitted by the small cell as these are transmitted on beams that are matched to the specific user channels and thus benefit from very large beamforming gains from the massive arrays. The range of the broadcasted signals can be extended (at the cost of transmission resources) by having each BS transmit many distinctly "precoded" reference signals (over time and frequency), each of which is precoded in a different beam direction. By monitoring the received signal strength of each of these precoded signals at each UT, a UT uses one or a few of the reference signals that are received at the highest signal power (and each at a sufficiently high power) for requesting a BS for association. As a result, the effective range of the control signals transmitted by a BS can be improved to such an extent so as to make the association methods disclosed herein viable at the expense of signaling overhead.

In one such example of association, representing one embodiment, a user monitors its received signal level on one or more precoded beams and uses that to predict the peak-rate that the UT may receive, that is the rate (e.g., the number of bits per resource element) that the user will receive, in the event that the user is served by the BS. Based on observations of the signals broadcasted by the network that are indicative of the load of the given BS, the UT predicts the fraction of resources that are to be allocated to the UT. The UT performs this computation for at least one BS that is different from its serving BS and determines whether or not switching the UT's association to a different BS is beneficial to the UT. If the UT determines that switching to another BS is preferable, then the UT broadcasts (in the uplink) information indicative of the request to switch and the identity of the preferred BS. In one embodiment, each BS allows a fraction of the requests to be honored. In an alternative embodiment, the admission control is performed by or in combination with controller entities.

Embodiments of the invention have one or more of the following advantages with respect to the previous scheduling and load balancing approaches:

1) Embodiments allow robust and practical load balancing across multi-tier wireless networks with massive MIMO deployments.
2) Much like existing deployments, mechanisms described herein allow user terminals to request new associations based on user-centric (and thus selfish) criteria, and BSs to selectively grant such requests. In one embodiment, the mechanisms use inter base-station interactions and interactions between base-stations and user terminals to yield efficient network wide performance.
3) In a static scenario, algorithms described herein iteratively reach near-optimal load balancing, i.e., near-optimal network-wide performance. In the scenarios encountered in practice, with user mobility, and spatio-temporal variations in user traffic demands, disclosed embodiments provide on-line mechanisms for effective load balancing adaptation.
4) Presented techniques are readily scalable in terms of the network size, and enable flexible scheduling at each BS, yielding network-wide fair allocation of resources.
5) Embodiments allow adaptive load balancing and resource allocation across the wireless network.
6) Embodiments allow the use of different fairness criteria over different tiers, bands, or even BSs, thereby enabling interoperability among different vendor products. Mechanisms described herein can also be readily modified to account for cost of use of the infrastructure resources (e.g., OPEX).
7) Mechanisms are also disclosed that may enable fair allocation of resources across BSs to different users, as well as service differentiation.

Problems solved by one or more embodiments include the following:

1) Scalable and robust online user-BS association and load balancing by use of user-centric association decisions and requests, and network admission control.
2) Mechanisms for choosing preferred association BSs at each user terminal that account for the load broadcasts from BSs, and associated load broadcast embodiments.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for a base station to associate with a user terminal in a wireless network, the method comprising:

broadcasting, by a first base station in the wireless network, information indicative of the load of the first base station;

receiving an association request from the user terminal for association with the first base station in response to the user terminal predicting a net throughput from the first base station, based on the information indicative of the load, being greater than net throughput from a second base station to which the user terminal is currently associated, wherein the load is a function of currently associated user terminals and their peak rates and calculation of an incremental load for the user terminals related to the wireless network, wherein a parameter used to calculate the load for the first base station is used in the calculation of the incremental load for the user terminals related to the wireless network; and determining whether to accept the association request while performing an association process for selectively allowing only a fraction of requests from user terminals to be associated with the base station.

2. The method defined in claim 1 further comprising admitting the fraction of user terminal association requests in each re-association cycle.

3. The method defined in claim 1 wherein the fraction is varied over time.

4. The method defined in claim 3 wherein the fraction is varied over time by using information indicative of past re-association requests to the first base station and past re-association requests by one or more other user terminals to other base stations in the wireless network when the one or more other user terminals were associated with the first base station.

5. The method defined in claim 3 wherein the fraction is varied over time based on current and past load levels of the first base station.

6. The method defined in claim 1 further comprising assigning resources to the user terminal in response to a controller in the wireless network signaling the first base station that association with the user terminal has been granted.

7. The method defined in claim 1 further comprising receiving signaling from a controller in the wireless network indicating association between the first base station and the user terminal can proceed.

8. The method defined in claim 7 wherein the signaling occurs in response to the controller allowing the association between the first base station and the user terminal based on load information from the first base station and one or more other base stations in the wireless network.

9. The method defined in claim 8 wherein the controller allowing the association is based on differentiated service requirements associated with one or more user terminals in the wireless network.

10. The method defined in claim 1 wherein receiving the association request is in response to the user terminal predicting a net throughput from the first base station being greater than net throughput from a second base station to which the user terminal is currently associated and one or more other base stations to which the user terminal could be associated.

11. The method defined in claim 1 further comprising using one or more controllers for association switching of the user terminal from the first base station to the second base station.

12. A base station for use in a wireless network, the base station comprising:

a transmitter operable to broadcast information indicative of the load of the base station;

a receiver to operable receive an association request from a user terminal for association with the first base station in response to the user terminal predicting a net throughput from the first base station, based on the information indicative of the load, being greater than net throughput from a second base station to which the user terminal is currently associated wherein the load is a function of currently associated user terminals and their peak rates and calculation of an incremental load for the user terminals related to the wireless network, wherein a parameter used to calculate the load for the base station is used in the calculation of the incremental load for the user terminals related to the wireless network; and an admission policy unit coupled to the receiver and operable to determine whether to accept the association request while performing an association process for selectively allowing only a fraction of requests from user terminals to be associated with the base station.

13. The base station defined in claim 12 wherein an admission policy unit is operable to admit the fraction of UT association requests in each re-association cycle.

14. The base station defined in claim 12 wherein the fraction is varied over time.

15. The base station defined in claim 14 wherein the fraction is varied over time by using information indicative of past re-association requests to the first base station and past re-association requests by one or more other user terminals to other base stations in the wireless network when the one or more other user terminals were associated with the first base station.

16. The base station defined in claim 14 wherein the fraction is varied over time based on current and past load levels of the first base station.

17. The base station defined in claim 12 wherein the base station further comprises a resource partitioning unit operable to assign resources to the user terminal in response to a controller in the wireless network signaling the first base station that association with the user terminal has been granted.

18. A method for a user terminal to associate with a base station in a wireless network, the method comprising:
receiving information indicative of the load of a first base station, wherein the load is a function of currently associated user terminals and their peak rates and calculation of an incremental load for the user terminals related to the wireless network, wherein a parameter used to calculate the load for the first base station is used in the calculation of the incremental load for the user terminals related to the wireless network;
predicting net throughput from the first base station based on the information indicative of the load;
determining the predicted net throughput is greater than net throughput from a second base station to which the user terminal is currently associated;
generating an association request to request association with the first base station based on determining that the predicted net throughput is greater than net throughput from the second base station; and
transmitting the association request to request association with the first base station.

19. The method defined in claim 18 wherein predicting net throughput from the first base station comprises predicting transmission resources that the first base station is to allocate to the user terminal.

20. The method defined in claim 18 wherein information regarding the transmission resources that the first base station is going to allocate to serving the user terminal is obtained from load information associated with the first base station and received by the user terminal and fairness criterion employed at the first base station in granting association requests.

21. The method defined in claim 20 wherein predicting net throughput from the first base station comprises predicting the rate the user terminal is to receive from the first base station during at least one scheduling event.

22. The method defined in claim 21 wherein predicting the rate the user terminal is to receive from the first base station during at least one scheduling event is based on reception of at least two distinctly precoded reference signals broadcasted by the first base station.

23. A user terminal for use in a wireless network, the user terminal comprising:
a receiver operable to receive information indicative of the load of a first base station in the wireless network;
a processor operable to predict net throughput from the first base station based on the information indicative of the load, to determine the predicted net throughput is greater than net throughput from a second base station to which the user terminal is currently associated, and to generate an association request to request association with the first base station based on determining that the predicted net throughput is greater than net throughput from the second base station, wherein the load is a function of currently associated user terminals and their peak rates and calculation of an incremental load for the user terminals related to the wireless network, wherein a parameter used to calculate the load for the first base station is used in the calculation of the incremental load for the user terminals related to the wireless network; and
a transmitter operable to transmit the association request to request association with the first base station.

24. The user terminal defined in claim 23 wherein the processor predicts net throughput from the first base station by predicting transmission resources that the first base station is to allocate to the user terminal.

25. The user terminal defined in claim 24 wherein information regarding the transmission resources that the first base station is going to allocate to serving the user terminal is obtained from load information associated with the first base station and received by the user terminal and fairness criterion employed at the first base station in granting association requests.

26. The user terminal defined in claim 23 wherein the processor predicts net throughput from the first base station by predicting the rate the user terminal is to receive from the first base station during at least one scheduling event.

27. The user terminal defined in claim 26 wherein the processor predicts the rate the user terminal is to receive from the first base station during at least one scheduling event based on reception of at least two distinctly precoded reference signals broadcasted by the first base station.

28. A wireless communication system comprising:
a plurality of base stations comprising a first base station and a second base station, wherein the first and second base stations broadcast information indicative of their load; and
a plurality of user terminals comprising a first user terminal, wherein the first user terminal is operable to receive the information indicative of the load of the first base station, predict net throughput from the first base station based on the information indicative of the load and operable to determine the predicted net throughput is greater than net throughput from the second base station to which the first user terminal is currently associated, and transmit an association request to request association with the first base station, wherein the load is a function of currently associated user terminals and their peak rates and calculation of an incremental load for the user terminals related to the wireless network, wherein a parameter used to calculate the load for the first base station is used in the calculation of the incremental load for the user terminals related to the wireless network, and further wherein the first base station is operable to receive an association request from the first user terminal and to determine whether to accept the association request while performing an association process for selectively allowing only a fraction of requests from user terminals to associated with the base station.

29. The wireless communication system defined in claim 28 wherein the first base station comprises an admission policy unit that is operable to admit the fraction of user terminal association requests in each re-association cycle.

30. The wireless communication system in claim 28 wherein the fraction is varied over time.

31. The wireless communication system defined in claim 30 wherein the fraction is varied over time by using information indicative of past re-association requests to the first base station and past re-association requests by one or more other user terminals to other base stations in the wireless network when the one or more other user terminals were associated with the first base station.

32. The wireless communication system defined in claim 30 wherein the fraction is varied over time based on current and past load levels of the first base station.

33. The wireless communication system defined in claim 28 wherein the base station further comprises a resource partitioning unit operable to assign resources to the first user terminal in response to a controller in the wireless network signaling the first base station that association with the first user terminal has been granted.

34. The wireless communication system defined in claim 28 wherein the first user terminal comprises a processor operable to predict net throughput from the first base station by predicting transmission resources that the first base station is to allocate to the user terminal.

35. The wireless communication system defined in claim 34 wherein information regarding the transmission resources that the first base station is going to allocate to serving the user terminal is obtained from load information associated with the first base station and received by the user terminal and fairness criterion employed at the first base station in granting association requests.

36. The wireless communication system defined in claim 28 wherein the first user terminal comprises a processor operable to predict net throughput from the first base station by predicting the rate the user terminal is to receive from the first base station during at least one scheduling event.

37. The wireless communication system defined in claim 36 wherein the processor predicts the rate the user terminal is to receive from the first base station during at least one scheduling event based on reception of at least two distinctly precoded reference signals broadcasted by the first base station.

38. The wireless communication system defined in claim 28 further comprising at least one controller for enabling association switching of a user terminal from one of the plurality of base stations to another.

39. The wireless communication system defined in claim 28 wherein the controllers selectively allow re-associations of user terminals of the plurality of user terminals to base stations and bands, by combining information indicative of the load of respective base stations.

40. The wireless communication system defined in claim 28 wherein selection by the controllers is based on differentiated service requirements.

* * * * *